Patented Oct. 28, 1952

2,615,849

UNITED STATES PATENT OFFICE 2,615,849

INFRARED QUENCHABLE ZINC SULFIDE PHOSPHORS

John A. Markoski, Lancaster, Pa., assignor to Radio Corporation of America, a corporation of Delaware No Drawing. Application December 31, 1948, Serial No. 68,729

4 Claims. (Cl. 252—301.6)

Many phosphors are known that exhibit varying degrees of phosphorescence, and of these some have rates of decay which are increased by infrared radiation, while others are substantially unaffected by such radiation.

In some uses where relatively long persistence of phosphorescence is desirable, there are times when it is expedient to quickly quench the phosphorescence. In the use of some types of cathode ray indicator tubes, changes in the visual picture on the screen is made difficult by the persistence of old information on the tube screen for long periods.

It is an object of this invention to produce a phosphor of relatively great intensity and long persistence which can be rapidly extinguished whenever desired.

It is another object of this invention to provide a long persistent phosphor material that can be suddenly quenched by application of infra-red radiation.

Zinc sulphide activated by copper alone or copper and silver together and also zinc cadmium sulphide activated by copper are known to be good phosphors of long persistence, but, when made by prior art methods, they cannot be efficiently quenched by infra-red radiation. I have discovered a method of making a zinc sulphide and a zinc cadmium sulphide phosphor activated with copper or copper and silver that are markedly subject to the quenching effect of infra-red radiation without detracting too greatly from the other desirable characteristics of such phosphors.

The particular phosphor materials used in my new process may be varied depending upon the desired color and intensity of fluorescence and phosphorescence, but as one example I will describe the preparation of a zinc sulphide phosphor.

A zinc sulphide phosphor is prepared from pure zinc sulphide powder which has been produced by any desired process well known in the art. For example, the zinc sulphide phosphor may be formed by precipitation of zinc sulphide from a zinc sulfate solution by the action of hydrogen sulphide. A copper salt is mixed with the zinc sulphide powder to act as an activator of the phosphor material. For example, 0.01 gram of copper in the form of copper nitrate is mixed with 100 grams of zinc sulphide powder. To provide the infra-red quenchable properties of the phosphor, I have found that a small amount of iron must be fired with the phosphor material. Thus, to the above mixture, including the 100 grams of zinc sulphide, there is added 0.0018 gram of iron in the form of ferric ammonium sulfate;

$$Fe_2(SO_4)_3(NH_4)_2SO_4 \cdot 24H_2O.$$

To this is added 2 grams of barium chloride and 5 grams of sodium chloride as a flux. All of the materials are mixed together as a paste and then dried. The dried phosphor material is placed in a silica crucible having a loosely fitting lid and the crucible is placed within a rafractory container with a graphite disc placed on the lid of the crucible. The refractory container is then also covered with a loosely fitting cover and placed into an oven, the temperature of which is raised to 1200° centigrade. The material is fired at this temperature for 45 minutes.

After the firing of the phosphor material, it is cooled in air, washed with a dilute sodium sulphide solution, formed by dissolving 25 cc. of 10% sodium sulphide in 2 liters of distilled water. The sodium sulphide reacts with one of the products formed during firing, namely zinc chloride, and in doing so precipitates very finely divided zinc sulfide on the phosphor crystals. The phosphor is then washed with double distilled $H_2O$ to remove soluble salts, and is finally dried after washing. This treatment results in a phosphor which is free-flowing and may be screened easily.

A phosphor material, made in the way described, can be used, for example, on a screen of a radar indicator tube. The received information on the screen of the tube may be suddenly wiped off by projecting infra-red rays onto the screen. In this manner, the information obtained from one range adjustment may be erased and the target can be set for any succeeding range adjustment. The application of infra-red radiation to the screen has no noticeable effect on the information obtained immediately after the preceding information is wiped off.

I have found that the presence of iron within the sulphide or cadmium sulphide phosphor material produces the infra-red quenchable characteristics in the phosphor. The useful amounts of iron that may be added to the phosphor before firing may vary up to 0.0036% to provide the best results. Using less iron than 0.0018% will provide a phosphor which is quenched slowly by infra-red radiation. Using a greater proportion of iron than 0.0036% decreases the fluorescent efficiency of the phosphor material to substantially zero, although the rapidity of quenching is proportionately increased. The use of iron as a material for providing an infra-red quenchable characteristic is most effective with zinc sulphide and also zinc cadmium sulphide either one being activated with copper alone or copper and silver together. These sulphide phosphors have relatively long phosphorescence. The sulfide phosphors activated with silver alone have relatively short presistence so that there is little or no need for providing quenchable characteristics.

The copper activated zinc sulphide as well as the copper activated zinc-cadmium sulphide are well known phosphor materials and may be made in any manner well known in the art. However, as a second example of a phosphor material, which may be provided with infra-red quenchable characteristics with the addition of iron, the following is one way in which copper activated zinc-cadmium sulphide may be formed.

A mixture of pure zinc sulphide and cadmium sulphide material is used in which the ratio of zinc sulphide to cadmium sulphide is 86:14. The zinc sulphide and cadmium sulphide material may be formed in any well known manner such as, for example, by precipitation of the zinc and cadmium sulphides from a mixture of zinc sulfate and cadmium sulfate solutions by the action of hydrogen sulphide. At this time, the material is activated with 0.0073% of copper metal which may be added to the mixture of sulfate solutions as copper nitrate. The copper is then precipitated as copper sulphide and forms a part of the sulphide slurry. The precipitate is allowed to settle and is carefully washed before there is added to the material 1.5% sodium chloride and 1.0% of ammonium chloride as fluxing agents. The iron is then added in the form of ferric ammonium sulfate and in an amount between 0.0018 and 0.0036% of the mixture. As in the process described above, the material is dried and fired in a similar manner for 30 minutes at 1220° centigrade. After firing, the charge is allowed to cool to room temperature and washed in a dilute mixture of ammonium hydroxide and sodium sulphide made by adding 10 cc. of concentrated $NH_4OH$ and 30 cc. of 10% $Na_2S$ solution to 2500 cc. of distilled water. After several more washes in distilled water, the material is dried and stored until ready for use.

While certain specific embodiments have been described, it will be understood that various changes and modifications may be made therein without departing from the spirit and scope of the invention.

What I claim is:

1. A phosphor material consisting essentially of a substance from the class consisting of zinc sulphide and zinc cadmium sulphide and between 0.0018% and 0.0036% iron, said phosphor material being activated with a small percentage of a material from the class consisting of copper, and copper and silver.

2. A phosphor material consisting essentially of copper activated zinc sulphide and from 0.0018% to 0.0036% by weight of iron.

3. A phosphor material consisting essentially of copper and silver activated zinc sulphide and from 0.0018% to 0.0036% by weight of iron.

4. A phosphor material consisting essentially of copper and silver activated zinc cadmium sulphide and from 0.0018% to 0.0036% by weight of iron.

JOHN A. MARKOSKI.

REFERENCES CITED

The following references are of record in the file of this patent:

UNITED STATES PATENTS

| Number | Name | Date |
| --- | --- | --- |
| 2,075,399 | Levy | Mar. 30, 1937 |
| 2,447,322 | Fonda | Aug. 17, 1948 |

OTHER REFERENCES

Dement, Fluorochemistry, Chem. Pub. Co., 1945, p. 309.

Forsythe and Adams, Fluorescent and Other Gaseous Discharge Lamps, 1948, Murray Hill Books, Inc., p. 50.

Kroger, Some Aspects of the Luminescence of Solids, 1948, Elsevier Publ. Co., pp. 192, 229.

Leverenz, PB25481, Final Report on Research and Development Declassified, Aug. 2, 1946, p. 98.